United States Patent
Shia et al.

(10) Patent No.: US 6,285,483 B1
(45) Date of Patent: Sep. 4, 2001

(54) OPTICAL SCANNER

(75) Inventors: Ting Shia, Hsinchu; Yao-Wen Chang, MiaoLi, both of (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/489,931

(22) Filed: Jan. 24, 2000

(51) Int. Cl.⁷ .................................................. G02B 26/08
(52) U.S. Cl. ......................... 359/196; 358/474; 358/494; 358/497
(58) Field of Search ...................................... 359/196, 212; 358/474, 494, 497

(56) References Cited

U.S. PATENT DOCUMENTS 6,163,387 * 12/2000 Han ........................................ 358/487

* cited by examiner

Primary Examiner—James Phan
(74) Attorney, Agent, or Firm—Dougherty & Troxell

(57) ABSTRACT

An optical scanner includes a base, a driving means, a chassis, a document board and a top cover. The base has a circuit board for process image document, a slide bar and a rail. The chassis has a guiding bore movably housing the slide bar and a pulley running on the rail, and is driven by the driving means. The document board lays over the base and may hold a document thereon. The top cover is pivotally engaged with one end of the document board. All the components are modularly designed. User may easily assemble and disassemble the scanner by reference to an assembly guide.

13 Claims, 2 Drawing Sheets

OPTICAL SCANNER

BACKGROUND OF THE INVENTION

1. Field of the Invention

This invention relates to an optical scanner and particularly to an optical scanner that has modular components to facilitate assembly, disassembly and transportation.

2 Description of the Prior Art

Scanner is a widely used computer peripheral device for capturing document image and converting the document image to digital signals for computer process.

FIG. 1 shows a typical conventional optical scanner 10 which generally includes a base 11, a driving means 12, a chassis 13, a document board 14 and a top cover 15.

The base 11 is a rectangular casing with a top opening for housing a circuit board 112, a slide bar 114 and a rail 116 therein. The circuit board 112 generally mates with the chassis 13 to. provide a fixed resolution power and is fixedly mounted in the base 11. The slide bar 114 is a round metal bar having two ends fixedly engaged in the base 11 at one side. The rail 116 is parallel with the slide bar 114 and is located at another side in the case 11. The casing has four side walls each has a plurality of slots 118 formed therein.

The driving means 12 is fixedly mounted in the base 11 and includes a motor 122 and a belt 124 driven by the motor 122. The belt 124 is parallel with the slide bar 114.

The chassis 13 includes mirrors, lens and a charged couple device (CCD, not shown in the figure) for transmitting and receiving document image. The image is converted to signals for transmitting to the circuit board 112 by mean of a flat cable 132. The chassis 13 further has a clamp 134 to engage with the belt 124, a pulley 136 running on the rail 116 and a guiding bore 138 slidably housing the slide bar 114.

The document board 14 is a rectangular board covering the top opening of the base and is transparent in the center for holding a document thereon. The document image may be transmitted to the chassis 13. The document board 14 has side edges which has a plurality of lugs 142 engageable with the slots 118. At one end of the document board 14, a pair of spaced pivot shafts 144 are provided.

The top cover 15 is a rectangular flat member having two pivot seats 152 at one end engageable with the pivot shafts 144. Under the top cover 15, a white pad (not shown in the figure) is provided to match the transparent portion of the document board 14.

The circuit board 112 usually can process only fixed resolution and is fixedly mounted in the base 11. The chassis 13 has to match with the circuit board 112 for a processing fixed resolution image. For assembly, the guiding bore 138 should engage with the slide bar 114 then mount the side bar 114 in the base 11. The pulley 136 is slidable on the rail 116. The lugs 142 should engage with the slots 118. The aforesaid assembly has the following disadvantages:

a. The scanner 10 is usually sold and delivered by complete unit. It means the assembly and packaging have to be completed before shipment. It is bulky and costs higher.

b. The components are not modularized. It is difficult for production and assembly.

c. It offers only fixed resolution and no casing color selection.

d. It is difficult to disassemble for repairs and maintenance.

SUMMARY OF THE INVENTION

In view of aforesaid disadvantages, it is therefore an object of this invention to provide a scanner that has modular components. Individual component modules may be produced and shipped independently without final assembly to a complete scanner unit. Assembly and package costs are lower. It is also more flexible to assemble different type of final product to suit user's needed.

It is another object of this invention to provide a scanner that offers different resolution. User may select different component module to obtain different resolution desired.

The scanner according to this invention includes a base, a driving means, a chassis, a document board and a top cover.

The base is a rectangular casing with a top opening. Inside the casing, a removable circuit board is provided to couple with the removable chassis for offering changeable resolution. A slide bar and a rail are parallel located at two sides within the casing. Inside the casing, a pair of lower support arms are provided to hold the slide bar at two ends. The base further has two screw seats and two latch grooves.

The driving means includes a motor driving a belt which is parallel with the slide bar. The chassis includes a clamp engaged with the belt, a pulley running on the rail and a guiding bore slidably housed the slide bar. The chassis connects with the circuit board through a flat cable.

The document board is a rectangular flat board covering the top opening of the base and is transparent in the center for holding a document thereon. It has two screw bores and two shafts at one end, and two latch lugs at another end engageable with the latch grooves. The top cover is a rectangular flat member having two pivot seats at one end engageable with the pivot shafts.

The components set forth above (including the base, driving means, chassis, document board and top cover) are modularized and may be produced and shipped individually. Different components modules may be used to assemble different final products (i.e., scanners). It offers more product selection to users. Assembly, disassembly and transportation become easier and less expensive.

Furthermore, the circuit board and the chassis are flexible to change to get different resolution desired. It may better meet user's requirements.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
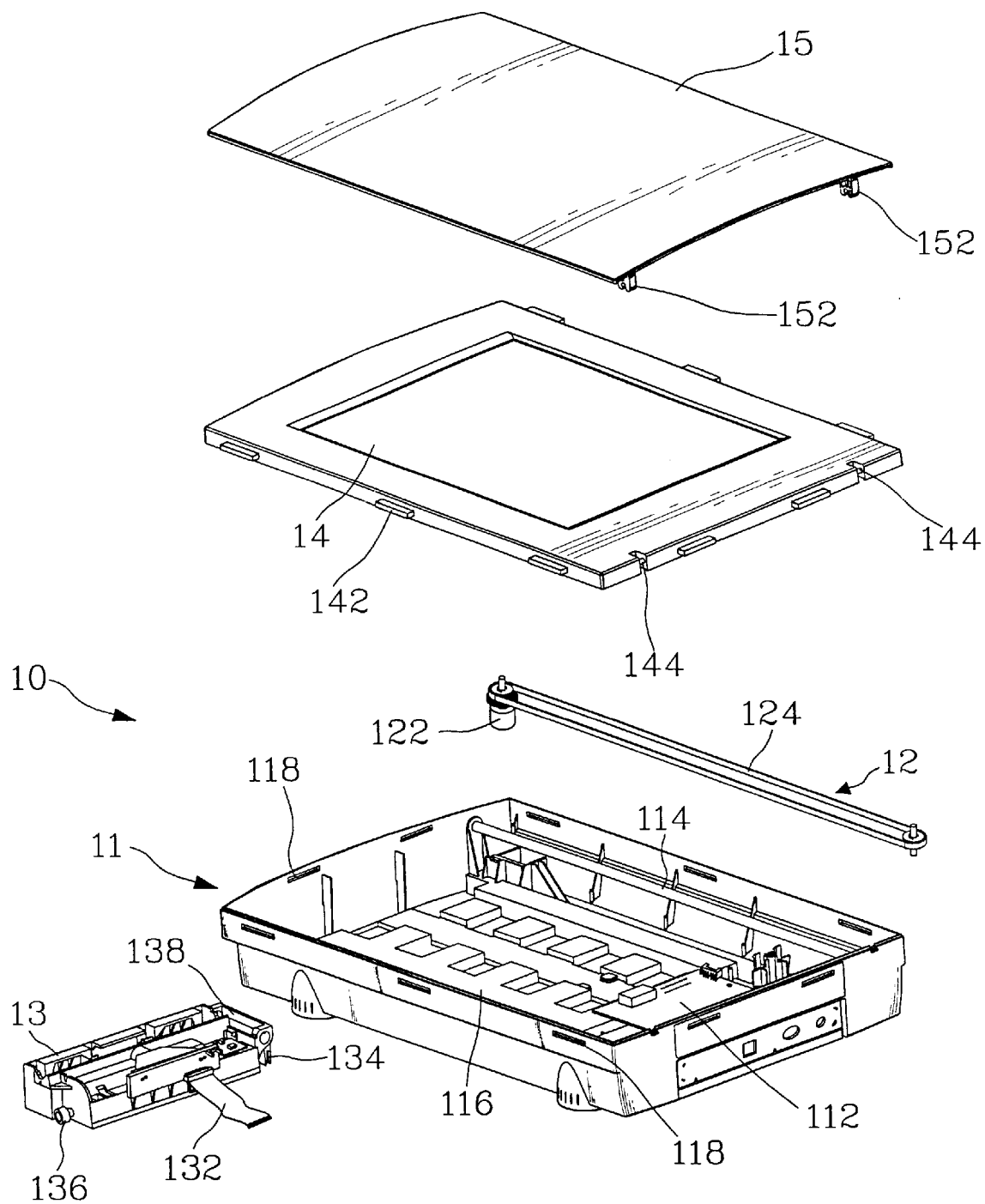
FIG. 1 is an exploded view of a conventional scanner.
Figure 2:
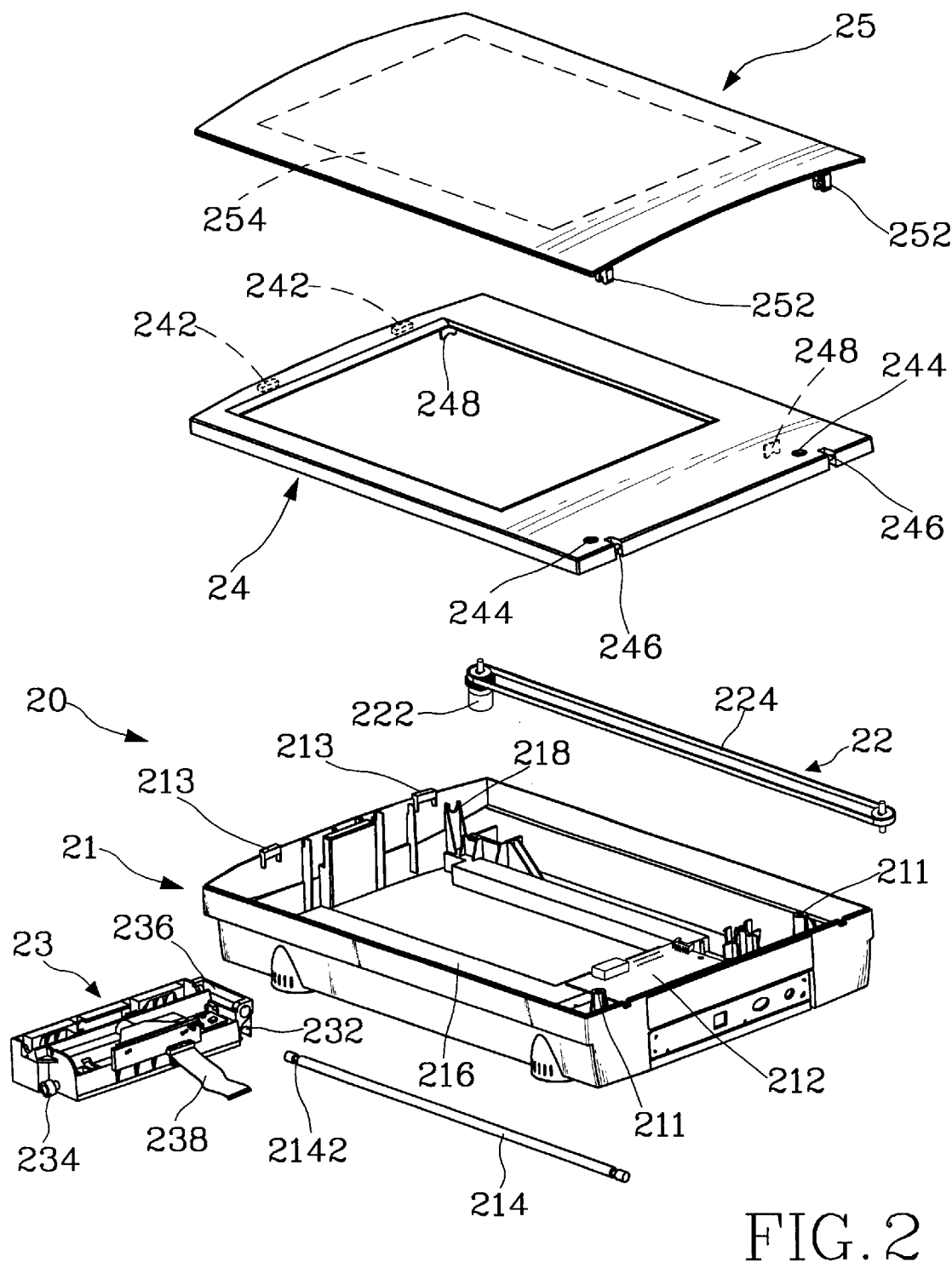
FIG. 2 is an exploded view of this invention.

Referring to FIG. 2, the scanner 20 according to this invention includes a base 21, a driving means 22, a chassis 23, a document board 24 and a top cover 25.

The base 21 is a rectangular casing with a top opening. Inside the base 21, there is a circuit board 212 screwed therein and is removable for mounting circuit board of different resolution (such as 300 dpi, 600 dpi, 1200 dpi). There is also a slide bar 214 and rail 216 parallelly located at two sides of the base 21. At two ends of the base 21, there are a pair of lower support arms 218 each has a semi-circular top notch for supporting a holding groove 2142 formed at either end of the slide bar 214. At one end of the base 21, there are a pair of screw seats 211. At another end of the base 21, there are a pair of latch grooves 213. The slide bar 214 is made of around metal bar.

The driving means 22 is fixedly mounted in the base 21 and includes a motor 222 driving a belt 224 which is parallel with the slide bar 214.

The chassis 23 includes a clamp 232 engaged with the belt 224, a guiding bore 236 slidably housing the slide bar 214 and a pulley 234 running on the rail 216. The chassis 23 connects with the circuit board 212 through a flat cable 238. When the motor 222 is activated, the belt 224 will be moved to and fro which in turns moves the chassis 23 reciprocally along the slide bar 214 and the rail 216 to perform scanning operation. The document board 24 is a rectangular board covering the top opening of the base 21 and is transparent in the center for holding a document thereon during scanning process. Document image is transmitted into the chassis 23. At one end of the document board 24, there are a pair of latch lugs 242 engageable with the latch grooves 213. At another end of the document board 24, there are a pair of screw bores 244 for screwing with the screw seats 211 and a pair of pivot shafts 246. Below the bottom surface of the document board 24, a pair of upper support arms 248 are provided each has a semi-circular notch mating with the lower support arm 218 to hold the holding groove 2142 of the slide bar 214.

The top cover 25 is a flat rectangular member having two pivot seats 252 at one end each has an open and near circular notch pivotally engageable with the pivot shaft 246. Below the top cover, a white pad 254 is provided to lay upon the document when in use.

All the components (i.e., base 21, driving means 22, chassis 23, document board 24 and top cover 25) are modularly designed and made. The specifications may be consistent and interchangeable and making assembly easy. The outside appearance may have variation while the internal components remain unchanged. The components may be individually produced and shipped without assembling into final products. Users may select components required and do the assembly themselves easily. By means of the DIY (Do It Yourself) approach, users may get a wide variety of scanners at lower cost.

Different resolution of chassis 23 may also be included to match with required circuit boards 212 to form different resolution of scanners. Because of the structure of the lower and upper support arms 218 and 248, the slide bar 214 may be taken out easily to change the chassis 23 and the circuit board 212 of different resolution. Thus one scanner may serve more than one resolution which otherwise would take more than one conventional scanner to do.

In summary, this invention offers the following advantages:
a. The base and the document board are fastened by screws, and groove. Assembly and disassembly is simple and easy.
b. The slide bar is held between the upper and lower support arm without fixed fastening. Change of chassis is simple.
c. Top cover engages with the document board by snap latching. Assembly and disassembly is easy.
d. Different resolution of circuit board and chassis may be changed easily in the base for providing different scanning resolution in a scanner with no need to replace a complete scanner to provide same function.

Because of this invention, scanner producer may produce modular components and ship individually without assembling into final product. The cost and risk are lower. End user may have a wide selection of product and may do the final assembly easily at a lower cost and may tailor and personalize the product to suit individual need. It may create greater market and achieve higher user satisfaction.

It may thus be seen that the objects of the present invention set forth herein, as well as those made apparent from the foregoing description, are efficiently attained. While the preferred embodiment of the invention has been set frothier for purpose of disclosure, modifications of the disclosed embodiment of the invention as well as other embodiments thereof may occur to those skilled in the art. Accordingly, the appended claims are intended to cover embodiments which do not depart from the spirit and scope of the invention.

What is claimed is:

1. An optical scanner, comprising:
   a base having a circuit board socket, a scanning path and a plurality of fastening devices;
   a circuit board engaged with the circuit board socket;
   a chassis movable reciprocally along the scanning path for performing a scanning operation;
   a driving device engaged with the chassis for moving the chassis to perform the scanning operation;
   a document board engaged with the base through the fastening devices, and
   a top cover pivotally engaged with the document board, wherein the fastening devices include latch grooves and screw seats, the document board has latch lugs and screw bores engaged respectively with the latch grooves and screw seats to facilitate assembly and disassembly of the document board with the base, and wherein the base, circuit board, chassis, driving device, document board and top cover are modularly designed to facilitate assembly and disassembly of the optical scanner.

2. The optical scanner of claim 1 wherein the scanning path of the base includes a slide bar and a rail, the chassis includes a guiding bore and a pulley mating respectively with the slide bar and the rail.

3. The optical scanner of claim 2 wherein the base further has a lower support arm which has a semi-circular notch for holding the slide bar to allow the slide bar be assembled or disassembled easily.

4. The optical scanner of claim 3, wherein the document board further has an upper support arm which has a semi-circular notch mating with the lower support arm to hold the slide bar therebetween.

5. The optical scanner of claim 1 wherein the driving means includes a motor and a belt, the chassis has a clamp engaged with the belt and is movable by the motor for scanning operation.

6. The optical scanner of claim 1 wherein the document board has a transparent board for holding a document.

7. The optical scanner of claim 6, wherein the top cover has a white pad mating with the transparent board.

8. An optical scanner, comprising:
   a base having a circuit board socket, a scanning path and a plurality of fastening devices, the base further having a lower support arm which has a first semi-circular notch for holding a slide bar to allow the slide bar to be assembled or disassembled easily;
   a circuit board engaged with the circuit board socket;
   a chassis movable reciprocally along the scanning path for performing a scanning operation;
   a driving device engaged with the chassis for moving the chassis to perform the scanning operation;

a document board engaged with the base through the fastening devices, the document board further has an upper support arm which has a second semi-circular notch mating with the lower support arm to hold the slide bar therebetween; and, a top cover pivotally engaged with the document board;

wherein the base, circuit board, chassis, driving means, document board and top cover are modularly designed to facilitate assembly and disassembly of the optical scanner.

9. The optical scanner of claim 8 wherein the scanning path of the base includes the slide bar and a rail, the chassis includes a guiding bore and a pulley mating respectively with the slide bar and the rail.

10. The optical scanner of claim 8 wherein the driving means includes a motor and a belt, the chassis has a clamp engaged with the belt and is movable by the motor for scanning operation.

11. The optical scanner of claim 8 wherein the document board has a transparent board for holding a document.

12. The optical scanner of claim 11 wherein the top cover has a white pad mating with the transparent board.

13. An assembly of optical scanner, comprising:

a base having a circuit board socket, a scanning path and a plurality of fastening means;

at least two chassis with different image scanning resolutions, each chassis being movable reciprocally along the scanning path for performing scanning operation;

at least two circuit boards, each circuit board being engageable with the circuit board socket, each circuit board being capable to provide a resolution matching with one corresponding chassis;

a driving means engaged with the chassis for moving the chassis to perform scanning operation;

a document board engageable with the base through the fastening means, and a top cover pivotally engaged with the document board;

whereby, by choosing a desired circuit board and one corresponding chassis from said chassis and circuit boards and having them assembled with the base, driving means, document board and top cover to form an optical scanner, image scanning resolution of the optical scanner can be chosen as desired.

* * * * *